US007925722B1

(12) United States Patent  
Reed et al.

(10) Patent No.: US 7,925,722 B1  
(45) Date of Patent: Apr. 12, 2011

(54) METHOD AND APPARATUS FOR DISCOVERY AND INSTALLATION OF NETWORK DEVICES THROUGH A NETWORK

(75) Inventors: John Reed, Concord, NC (US); James Shelton, Cooper City, FL (US)

(73) Assignee: Avocent Corporation, Huntsville, AL (US)

( * ) Notice: Subject to any disclaimer, the term of this patent is extended or adjusted under 35 U.S.C. 154(b) by 1277 days.

(21) Appl. No.: 10/632,097

(22) Filed: Aug. 1, 2003

(51) Int. Cl.  
*G06F 15/173* (2006.01)

(52) U.S. Cl. ...................................................... 709/220

(58) Field of Classification Search .................. 709/220, 709/223, 217, 230  
See application file for complete search history.

(56) References Cited

U.S. PATENT DOCUMENTS

| | | | | |
|---|---|---|---|---|
| 5,796,953 A * | 8/1998 | Zey ................................ 709/227 |
| 5,812,819 A * | 9/1998 | Rodwin et al. .................... 703/23 |
| 5,943,321 A * | 8/1999 | St-Hilaire et al. ............. 370/259 |
| 6,052,725 A * | 4/2000 | McCann et al. ............... 709/223 |
| 6,134,581 A | 10/2000 | Ismael et al. |
| 6,182,142 B1 | 1/2001 | Win et al. |
| 6,220,768 B1 * | 4/2001 | Barroux ......................... 709/224 |
| 6,233,616 B1 * | 5/2001 | Reid ............................. 709/225 |
| 6,249,527 B1 * | 6/2001 | Verthein et al. ............... 370/466 |
| 6,298,383 B1 * | 10/2001 | Gutman et al. ................ 709/229 |
| 6,389,464 B1 * | 5/2002 | Krishnamurthy et al. .... 709/220 |
| 6,496,511 B1 * | 12/2002 | Wang et al. .................... 370/401 |
| 6,584,074 B1 * | 6/2003 | Vasamsetti et al. ............ 370/254 |
| 6,633,587 B1 | 10/2003 | Bennett |
| 6,658,010 B1 * | 12/2003 | Enns et al. ..................... 370/401 |
| 6,681,250 B1 * | 1/2004 | Thomas et al. ................ 709/226 |
| 6,757,723 B1 * | 6/2004 | O'Toole et al. ................ 709/222 |
| 6,779,025 B1 * | 8/2004 | Wolfe et al. ................... 709/219 |
| 6,944,761 B2 | 9/2005 | Wood et al. |
| 6,970,459 B1 * | 11/2005 | Meier ............................ 370/389 |
| 6,982,966 B2 * | 1/2006 | Eidenschink et al. ......... 370/322 |
| 7,002,971 B1 * | 2/2006 | Enns et al. ..................... 370/401 |
| 7,035,257 B2 * | 4/2006 | Vafaei ............................ 370/389 |
| 7,039,688 B2 * | 5/2006 | Matsuda et al. ............... 709/220 |
| 7,089,259 B1 * | 8/2006 | Kouznetsov et al. .......... 707/102 |
| 7,093,008 B2 | 8/2006 | Agerholm et al. |
| 7,124,175 B1 * | 10/2006 | Wolfe et al. ................... 709/219 |
| 7,159,007 B2 * | 1/2007 | Stawikowski ................. 709/202 |
| 7,159,016 B2 * | 1/2007 | Baker ............................ 709/220 |
| 7,197,549 B1 * | 3/2007 | Salama et al. ................. 709/223 |
| 7,228,345 B2 * | 6/2007 | Larson et al. ................. 709/222 |
| 7,240,102 B1 * | 7/2007 | Kouznetsov et al. .......... 709/220 |

OTHER PUBLICATIONS

Case, J. et al., "A Simple Network Management Protocol (SNMP)," RFC 1157, IETF Network Working Group, May 1990.  
McCloghrie, K. et al., "Management Information Base for Network Management of TCP/IP-based internets: MIB-II," RFC 1213, IETF Network Working Group, Mar. 1991.  
Postel, J, "User Datagram Protocol," RFC 768, IETF Network Working Group, Aug. 1980.

* cited by examiner

*Primary Examiner* — David Y Eng  
(74) *Attorney, Agent, or Firm* — Davidson Berquist Jackson & Gowdey, LLP

(57) ABSTRACT

A method and apparatus of discovering and installing managed appliances remotely using a protocol for communication on the network is described. The protocol permits a client workstation to issue a broadcast message on the network. The managed appliances will send a reply message to the workstation which includes their current IP configuration. If a managed appliance has not been properly configured, the workstation can remotely instruct the managed appliance to set its IP configuration as desired. In the event that the managed appliance is a KVM switch, the managed appliance can store information about the servers connected to it. This information can be requested by and reported to the workstation using the protocol.

18 Claims, 4 Drawing Sheets

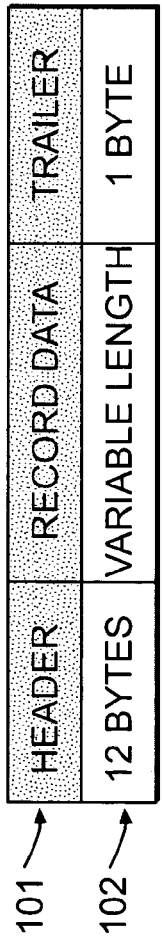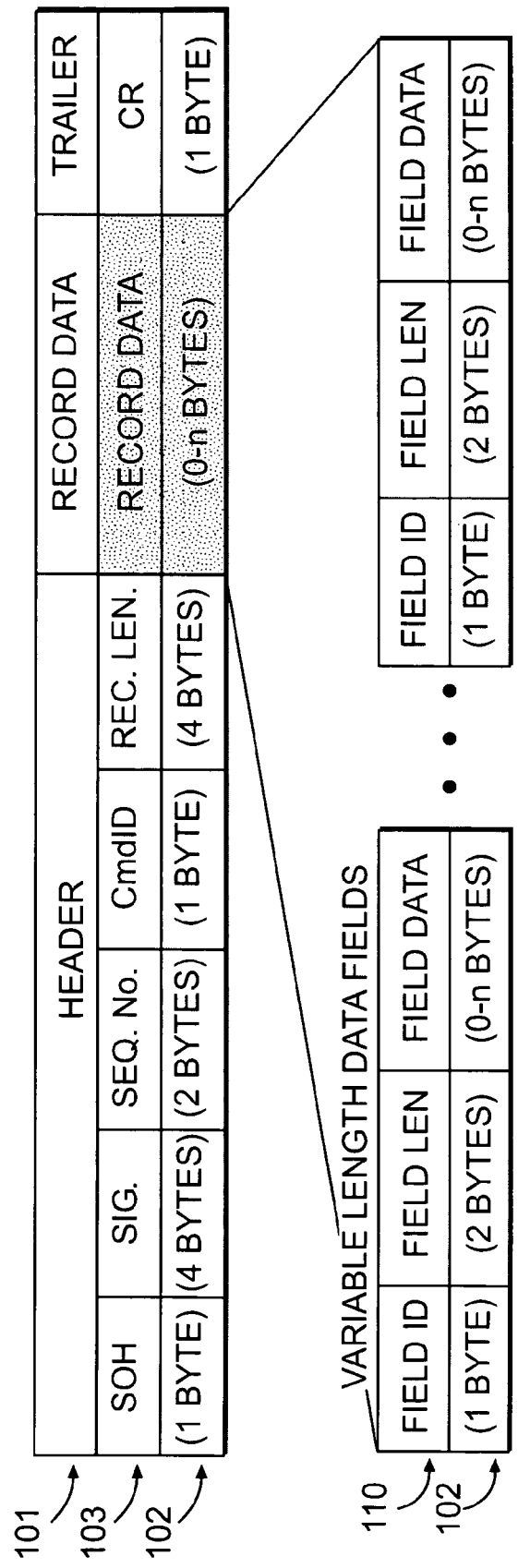
FIG. 2
FIG. 3

METHOD AND APPARATUS FOR DISCOVERY AND INSTALLATION OF NETWORK DEVICES THROUGH A NETWORK

CROSS REFERENCE TO RELATED APPLICATIONS

This application is related to U.S. Pat. No. 7,506,041, filed Aug. 1, 2003, issued Mar. 17, 2009.

FIELD OF THE INVENTION

This application relates to the discovery and installation of devices across a network.

BACKGROUND OF THE INVENTION

Newly installed devices on a network require a network administrator or the like to set up certain parameters of the device during installation. Some of the parameters include the IP address, a subnet mask, and the gateway for the device.

Traditionally, an administrator would have to physically and directly connect to the device in order to configure this information. Alternatively, devices could connect to a network and pull their IP configuration information from a centralized BOOTP server.

With the advent of more complex devices, administrators need to be able to set (or "push") a network device's IP configuration from a client workstation. Administrators also need to be able to obtain information from those network devices across the network. These more complex network devices include managed appliances that serve as keyboard/video/mouse (KVM) switches, such as those sold by Avocent Corporation of Huntsville, Ala. Another type of managed appliance is a serial switching device that allows a workstation user to switch among different serially-managed devices. An example of such a device is the CPS1610 product also sold by Avocent Corporation.

KVM switch managed appliances permit a user at a client workstation connected to the network to be able to control a server through the KVM switch. Control of the server originates at the workstation. The control signals pass through the network to the KVM switch. The KVM switch routes the control signals to the particular server that the user is attempting to control. The server can also send data and signals, e.g., video signals, back to the user at the client workstation. The information is transmitted from the server to the KVM switch. The KVM switch then formats the information into a network-compatible format and transmits the information across the network to the client workstation. The client workstation decodes or reformats the received information and responds to it appropriately. In the case of video data received from the KVM switch, the client workstation formats the video data into an appropriate format for display on the video monitor connected to the workstation. Other information that can be transmitted from the server to the workstation includes keyboard information, cursor-control device information, or any other information that can be received and utilized by the workstation.

A KVM switch managed appliance can allow a user at a client workstation to communicate with hundreds, even thousands, of servers through a single managed appliance. In large computer network environments, there may be several KVM switch managed appliances connected to a single network. Moreover, because the client workstation and the managed appliance are frequently connected across an Ethernet-type network, the workstation user and the managed appliance can be located several thousand feet apart. A KVM switch managed appliance can also be connected to the internet, directly or through an Ethernet-type network, permitting a workstation user to be connected to the managed appliance from anywhere in the world. In such a situation, one person may be connecting the managed appliance to the internet and the bank of servers, while another person located hundreds of miles away may be the administrator responsible for actually configuring the managed appliance. In that situation, it is very difficult and time consuming for the network administrator to travel to the location of the managed appliance in order to configure that device for communication through the internet or even through a local area network (LAN).

BRIEF SUMMARY OF THE INVENTION

The present invention describes an install and discovery protocol (IDP) that network client applications running on client workstation computers can use to install and discover managed appliances across a general purpose network. The network can be a wired or a wireless network. In discovering managed appliances on the network, the network client application and workstation can locate managed appliances on the network. This includes appliances that do and do not have an IP address. The workstation computers can install the managed appliances by setting the IP configuration of the appliance that does not have an IP address over the network.

In a preferred embodiment of the present invention, the install and discovery protocol exchanges messages via the user data protocol (UDP) documented in RFC768 (published by the Internet Engineering Task Force (IETF)) using a predefined UDP port. Managed appliances listen for UDP messages on this port.

In one embodiment of the present invention, the IDP also provides for some simple network management protocol (SNMP) commands that allow a client to access certain management information base (MIB) objects in the appliance. Typically, an MIB is a set of managed objects that define what data can be obtained from an appliance. In a preferred embodiment, a managed appliance must implement an SNMP agent and an enterprise MIB in order to support the SNMP commands. When using the IDP, certain Object Identifiers (OIDs) may be retrieved from the appliance. In one aspect of the invention, the OIDs defined in the enterprise MIB that are marked with a "discover" flag in the "availability" keyword may be retrieved. In addition to the specific enterprise MIB OIDs, the MIB-II OIDs sysName and sysObjectID can be retrieved from the appliance. The sysName and sysObject ID OIDs are defined in the IETF's RFC1213. In one aspect of the invention, no other OIDs are accessible through the IDP.

The ability to obtain OIDs and values for OIDs across a network allows a client workstation to remotely obtain information about the servers connected to the KVM switch managed appliance. The information is contained in the OIDs and the values for the OIDs. For example, if the name given to a particular server connected to a managed appliance is changed in the managed appliance, that new name can be transmitted across the network to a client workstation. The client workstation can then update its listing of the servers attached to the appliance to include the new server name. Other server information can also be sent to the workstation in the same way.

BRIEF DESCRIPTION OF THE DRAWINGS

The invention will be more fully understood from the following detailed description taken in conjunction with the accompanying drawings in which:

FIG. 2 shows an exemplary packet for communication using an installation and discovery protocol according to the present invention.

FIG. 3 shows another exemplary embodiment of a communication data packet according to the present invention.

DETAILED DESCRIPTION OF THE INVENTION

When connecting a new managed appliance to a network, it is necessary to configure certain information in the managed appliance before it is available to communicate across the network. The present protocol permits the installation of a new managed appliance on a general purpose network without having to configure the information in the managed appliance locally. In other words, a user at a workstation remote from the managed appliance can communicate with the managed appliance across the network in order to configure certain information in the managed appliance so that the managed appliance can thereafter operate normally and communicate on the general purpose network.

Figure 1:
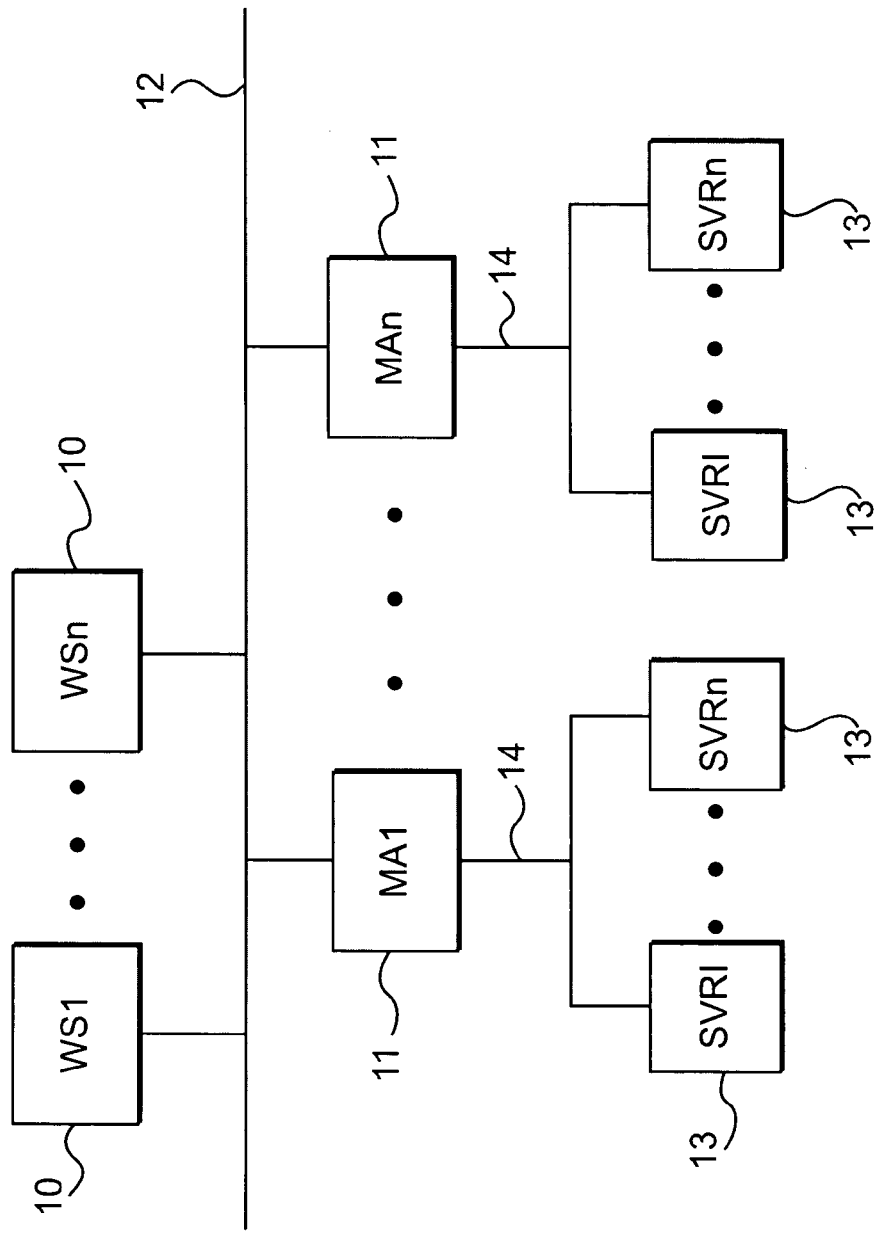
FIG. 1 illustrates a network application including a plurality of workstations and a plurality of managed appliances in which the managed appliances are discovered and installed according the presently described protocol.

Referring to FIG. 1, one or more workstations 10 WS1-WSn are connected to a general purpose network 12. The network 12 can be a wired network, a wireless network, or a network having wired and wireless components. Also attached to the general purpose network 12 are one or more managed appliances 11 MA1-MAn. In the situation where each managed appliance is a keyboard/video/mouse (KVM) switch, each managed appliance communicates with one or more servers 13 SVR1-SVRn. Alternatively, instead of managed appliance 11 communicating with servers, managed appliance 11 can communicate with any number of serial devices.

Communication between managed appliance 11 and server bank 13 is conducted over communication link 14. Communication link 14 may be a plurality of dedicated cables, for example category 5 (CAT5) cables. In such a configuration, there is typically one CAT5 cable extending between managed appliance 11 and each server 13. Thus, if there are 10 servers 13 connected to managed appliance 11, there would be 10 CAT5 cables extending between managed appliance 11 and the bank of 10 servers 13. As shown in FIG. 1, there can be a virtually unlimited number of servers 13 connected to a single managed appliance 11 where the managed appliance is a KVM switch managed appliance.

An alternative method of connection between managed appliance 11 and the bank of servers 13 involves the use of a plurality of dedicated cables for each server 13. Thus, in such an arrangement, there can be for example a set of three cables extending between the managed appliance 11 and each server 13. One of the three cables extending is for the video signals communicated to and from server 13. A second cable is for the mouse (i.e., the cursor control device) signals which are communicated to and from server 13. And finally, the third cable is for communication of keyboard signals to and from server 13.

Another alternative connection configuration between managed appliance 11 and server bank 13 involves the use of so called daisy chain connections. In such an arrangement, a single cable, for example a CAT 5 cable, is connected between managed appliance 11 and a first server 13. The connection 14 is then daisy chained from the first server 13, for example SVR1, to a second server 13, for example SVR2. Server SVR2 is then connected to server SVR3, and server SVR3 is then connected to server SVR4, etc. In such an arrangement, managed appliance 11 can communicate with any one of the servers SVR1 through SVRn over the daisy-chained communication link 14.

A further alternative connection configuration between managed appliance 11 and server bank 13 involves the use of a combination of any of the foregoing connection configurations for communication link 14. Thus, for example, some servers 13 could be connected to managed appliance 11 via a CAT5 cable. Other servers could be connected via a plurality of dedicated cables. Yet other servers could be connected via a daisy-chain connection.

Also as shown in FIG. 1, there can be a virtually unlimited number of managed appliances 11 connected to general purpose network 12. Indeed, general purpose network 12 can be the internet, or a local area network, or a combination of a local area network and the internet, or any other general purpose network, or combination of networks, utilizing a standard or proprietary communication protocol.

As FIG. 1 shows, each managed appliance connected to network 12 can be a KVM switch managed appliance. Each such managed appliance 11 can be connected to its own server bank 13 in any of the alternative ways described above. For example, managed appliance 1 can communicate with its servers 13 using a daisy-chained connection configuration. While, on the other hand managed appliance 2 can communicate with its server bank 13 utilizing for each server a plurality of dedicated keyboard, video monitor, mouse cables. Managed appliance 3 can communicate with each server 13 via a single CAT 5 cable. In other words, the type of connection between each managed appliance and its associated servers can be any one of the different types of communication configurations described above or any other alternative communication connection configuration. Moreover, these connection configurations can vary from managed appliance to managed appliance without regard to what type of connection is used with any of the other managed appliances.

As shown in FIG. 1, there can be any number of workstations 10 connected to network 12. As contemplated in the present application, any of the workstations 10 can communicate with any of the managed appliances 11 to discover and install any of those managed appliances.

Discovery is accomplished when the client workstation sends a broadcast message to the subnet containing the appliances which the client wishes to install and discover. In one embodiment of the present invention, the install and discovery protocol is implemented using User Datagram Protocol (UDP). Indeed, the present install and discovery protocol can be preferably implemented using any communication protocol which does not require confirmation of a receipt of messages across the network. Aspects of the present install and discovery protocol can be implemented using other protocols such as Transmission Control Protocol (TCP). However, if the IDP will implement broadcast messages, protocols which require the receipt of confirmation messages, such as TCP, cannot be used. This is because, in transmitting broadcast messages to discover managed appliances, the client workstation does not have a destination address (i.e., an IP address) for the managed appliances it seeks to discover on the network. Therefore, the managed appliance will not be able to transmit a confirmation message because it was not the particular device to which the broadcast message was transmitted.

In a preferred embodiment, when the client workstation sends UDP broadcast messages to the subnet, all appliances on the subnet report their IP configuration information back to the client. Even appliances that do not have an IP address must report their model and MAC address back to the client. This means that appliances that do not have an IP address must be able to listen for Ethernet packets even when no IP address has been assigned to the appliance. They also must be able to create an IP/UDP reply packet (in the preferred UDP communication protocol) when they do not have an IP address. This discovery reply packet should include the following fields if the appliance does not have an IP address: an Ethernet source address field, which includes the MAC address of the appliance; an Ethernet destination address field, which includes the Ethernet source address from the discovery request message; an IP source address field, which is set to a predefined value such as "1.2.3.4"; an IP destination address field, which is the IP source address from the discovery request message; a UDP discover reply MAC field, which is the MAC address of the appliance; a UDP discover reply IP field, which is set to a predefined value such as "0.0.0.0"; a UDP discover reply mask field, which is set to a predefined value such as "0.0.0.0"; a UDP discover reply gateway field, which is set to a predefined value such as "0.0.0.0".

If an appliance already has an IP address assigned to it, the client can send the discover message directly to the IP address of the appliance. In such a situation, the client does not need to send a broadcast message. Also, if the install and discovery protocol is implemented using a protocol such as TCP which requires acknowledgement messages, installation of a managed appliance can be implemented so long as the client knows the IP address of the managed appliance.

Installation allows the client to remotely set the IP configuration of appliances that do not have an IP address. This configuration information includes the IP address, the subnet mask, and the gateway for the managed appliance. In a preferred embodiment, this is a two-step process. Step one requires that the new configuration be tested. While step two installs the final IP address. Testing is desirable so that the appliance does not get configured with an invalid gateway or subnet mask.

To test the new configuration, the client sends a UDP broadcast containing the MAC address, IP address, subnet mask, and the gateway to the appliance. Only the appliance with the specified MAC address should reply to this request. If the reply is received, installation of the final IP address occurs. Installation of the final IP address permanently sets the IP configuration into the appliance. The appliance's IP configuration can be reset only after the current IP configuration has been cleared. A user can physically go to the device to set or clear the IP configuration. The IP configuration can also be set or cleared via the Secure Management Protocol disclosed in related U.S. Pat. No. 7,506,041, filed Aug. 1, 2003, issued Mar. 17, 2009.

Upon receipt of a test IP configuration request message, an appliance lacking an IP address should temporarily set its IP configuration to the values received in the request message. The appliance should then use the normal IP/UDP stack to send the test IP configuration reply message so that the normal flow of messages is tested (i.e. subnet mask, Ethernet Address Resolution Protocol (ARP), etc.). If an invalid gateway or subnet mask was specified in the testing step, the test IP configuration reply message will not get returned to the client. Only upon receiving the set IP configuration message should the appliance permanently set the IP configuration information.

FIG. 2 shows the packet format for a preferred embodiment of the present install and discovery protocol. Description line 101 shows the three distinct parts of the install and discovery protocol message format. Line 102 shows the length of each of the three parts of the message format. In the presently preferred embodiment, the header is made up of twelve bytes. The record data portion of the message format is a variable length which will be further described below. Finally, the trailer portion of the install and discovery protocol message format is preferably one byte.

The preferred embodiments of the header, trailer, and record data fields of the install and discovery protocol messages will now be described. The IDP header consists of the following fields. The start of heading (SOH) field is the start flag marking the beginning of the message. The SOH field is preferably one byte long. The signature field is the unique signature ID indicating that this is an install discovery protocol message. This field is preferably four bytes long. Preferably, this value will be the ASCII representation of a label identifying the IDP protocol such as "IDP." The sequence number field is the unique packet sequence number used for ordering packets. This field is preferably two bytes long. The value of the sequence number field increments by one for each packet sent. Preferably, this value is sent in network byte order and the range is from 1-65,535. The command ID field contains the unique code for the IDP command contained in the message. This field is preferably one byte in length. Finally, the record length field is the total number of bytes in the record data field that follows. The length of the record length field is preferably four bytes long. The record length value is sent in network byte order and ranges from 0-4,294,967,295.

In the preferred embodiment, there are five commands which may appear in the command ID field. The five commands are labeled Discover, Test IP Configuration, Set IP Configuration, SNMP Get, and SNMP Get Next. There is a request message and a reply message for each of these five commands (e.g., SNMP Get Request message, Discover Reply message, etc.).

The trailer portion of the IDP message protocol is preferably one byte in length and contains the hexadecimal representation of a carriage return to mark the end of an IDP message.

The record data portion of the IDP message is a variable length field containing the data to be sent using the protocol. The data is encoded based upon the IDP command ID.

Referring to FIG. 3, certain IDP commands may contain variable length data fields encoded within the record data portion of the IDP message. There can be more than one variable length data field in the record data portion. These variable length data fields will use an extensible record format having three fields, namely: field ID, field length, and field data. The field ID field is one byte in length; the field length field is two bytes in length; and the field data field is 0-n bytes in length. The field ID field contains a unique field ID for this field within the record data. The field length field is the total number of bytes in the field data that follows. This value is preferably sent in network byte order and ranges from 0-65,535. The field data field contains the data for the field.

FIG. 3 shows the IDP message having a plurality of variable length data fields contained within the record data portion of the IDP message. An IDP message can have any number of variable length data fields from 1-n. The variable length data fields contained in the record data portion of the message may appear in any order. Again, row 101 of FIG. 3 labels the portions of the IDP message. Row 103 identifies the fields contained within each of the three portions of the IDP message. Row 102 identifies the length of each of the fields contained within the IDP message. Row 110 contains the field names for the fields in a variable length data field.

As shown in FIG. 3 one or more variable length data fields are contained within the record data portion of an IDP message. The variable length data fields contained in the record data portion of the message may appear in any order.

Figure 4:
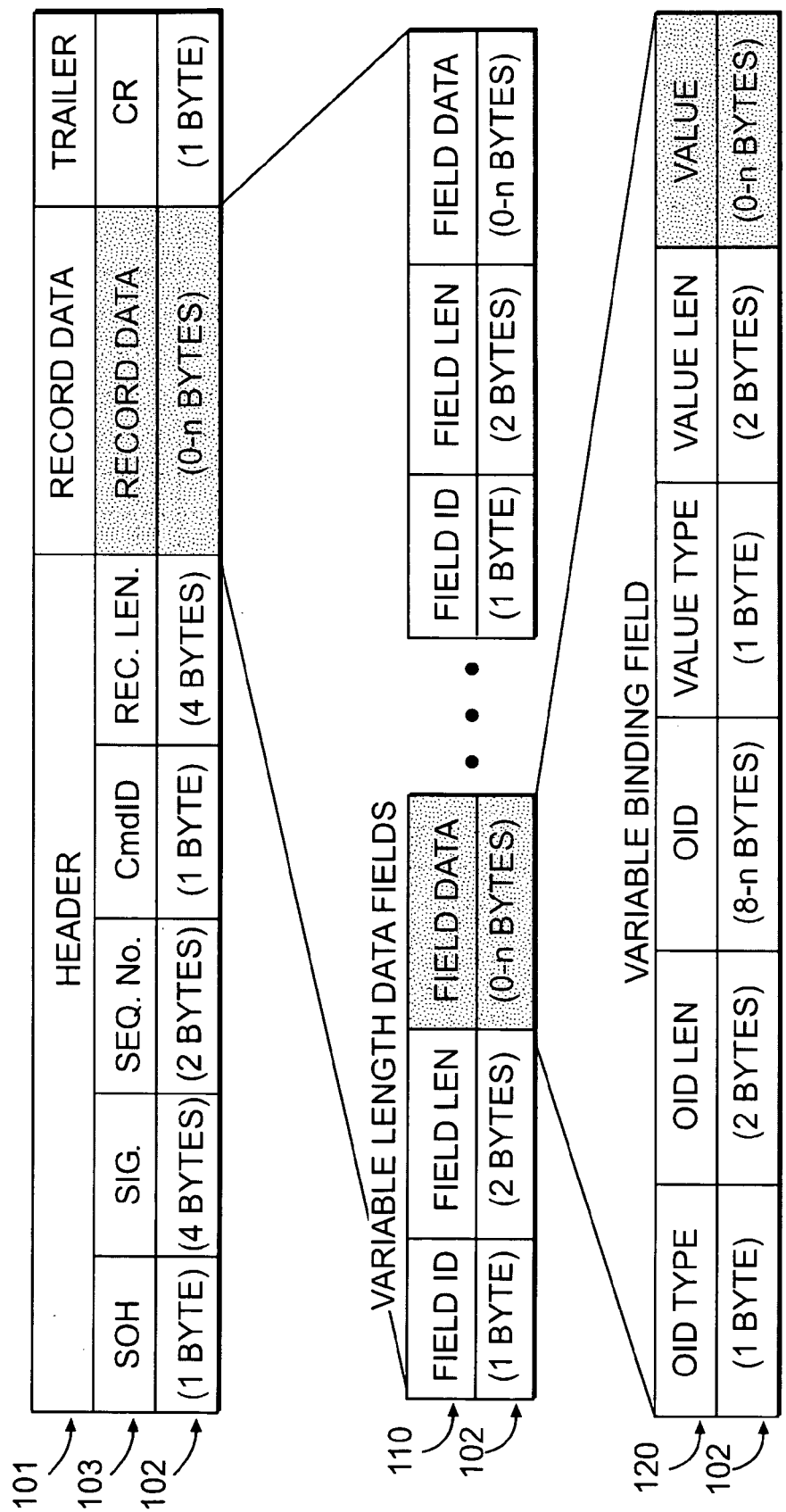
FIG. 4 shows a further exemplary communication data packet according to the present invention.

In a preferred embodiment, for some of the IDP commands, specifically the SNMP commands, the variable length data fields of the record data may contain a variable binding field. These variable binding fields contain further encoding. FIG. 4 shows how the variable binding field appears within the field data sections of an IDP message. Row 120 identifies the name of each of the sub-fields for a given variable binding field. The sub-fields include OID type, OID length, OID value, value type, value length, and value. Preferably, the OID type sub-field is one byte in length, the OID length sub-field is two bytes in length; the OID value sub-field is 8-n bytes in length; the value type sub-field is one byte in length; the value length sub-field is two bytes in length; and the value sub-field is O-n bytes in length.

The OID type sub-field has a predefined value indicating that the variable binding field is an object identifier. The OID length sub-field contains the number of bytes in the OID that follows. Preferably, this value is sent in network byte order. The OID value sub-field contains the OID as an array of integers, each integer being four bytes long. Preferably, the minimum length is eight bytes because the smallest OID that can be used in the command is two integers (example: 0.0). Thus, the upper limit "n" has to be a multiple of four. The value type sub-field contains the type of the variable binding value. In the preferred embodiment, the variable binding value can be one of the following standard SNMP types: ASN_INTEGER, ASN_BITS, ASN_OCTET_STRING, ASN_NULL, ASN_OBJECT_IDENTIFIER, ASN_SEQUENCE, ASN_SEQUENCEOF, ASN_IP_ADDRESS, ASN_COUNTER32, ASN_GUAGE32, ASN_TIMETICKS, ASN_OPAQUE, ASN_COUNTER64, and ASN_UNSIGNED32.

Objects in the MIB are defined using Abstract Syntax Notation One (ASN.1) defined in ITU-T recommendation X.208 (ASN.1). This specification also specifies basic data types and how they are transmitted. So for each object contained in the MIB it has an associated type. INTEGER: a data type taking a cardinal number as its value. BIT STRING: a data type taking zero or more named bits as its value. OCTET STRING: a data type taking zero or more octets as its value. Each byte in an octet string may take any value from 0 to 255. OBJECT IDENTIFIER: data type specifying an OID. SEQUENCE: a data type denoting an ordered list of zero or more elements which are other ASN.1 types. UNSIGNED: a data type taking a unsigned number. COUNTER32: a data type representing a non-negative integer, which monotonically increases until it reaches a maximum value, when it wraps back to zero. GAUGE32: a data type representing a non-negative integer, which may increase or decrease, but which may never exceed the maximum value. TIMETICKS: a data type representing a non-negative integer, which counts the time in hundredths of a second since some epoch. OPAQUE: a data type representing an arbitrary encoding. IP_ADDRESS: A data type representing an IP address. COUNTER64: a data type used only when Counter32 would wrap in less than an hour.

The value length sub-field contains the length of the variable binding value that follows. Preferably, this value is sent in network byte order. The value sub-field contains the variable binding value.

In the preferred embodiment, the value section of the variable binding field is encoded differently based upon the value type. For example, the ASN_INTEGER value type has one byte for the value type, two bytes for the value length, and four bytes for the value. The ASN_COUNTER32, ASN_GUAGE32, and ASN_TIMETICKS value types have one byte for the value type, two bytes for the value length, and four bytes for the value. The ASN_COUNTER64 value type has one byte for the value type, two bytes for the value length, and eight bytes for the value. The ASN_OCTET_STRING, and ASN_RFC1213_DISPLAY_STRING (defined in the IETF's RFC1213) value types have one byte for the value type, two bytes for the value length, and 1-n bytes for the value. ASN_OBJECT IDENTIFIER has one byte for the value type, two bytes for the value length, and 1-n integer OID values which are each four bytes corresponding to the value of the data in the variable binding field. ASN_NULL has one byte for the value type, two bytes for the value length, and no bytes corresponding to the value.

The commands utilized in the preferred embodiment of the invention will now be described. Each command type has a request message and a reply message associated with it. For example, the Discover command has a Discover Request message and a Discover Reply message.

The Discover Request message is a message sent from a client to a managed appliance to request that the appliance report its information (i.e. model type, MAC address, IP address, subnet mask, gateway address, etc.) back to the client. In the preferred embodiment, there are no variable length data fields in a Discover Request message. The record length value will always be one to account for a predefined field terminator.

Upon receipt of the Discover Request message, the managed appliance will generate a Discover Reply message containing its model type, MAC address, IP address, subnet mask, and gateway address.

The Discover Reply message is sent from a managed appliance to a client in response to a Discover Request message. In a preferred embodiment, the record data section of the message includes the following variable length data fields: appliance model type field; MAC address field; IP address field; subnet mask address field; and gateway address field. These variable length data fields are followed by a predefined field terminator.

The appliance model type field has a predefined field ID that is unique and indicates that the sub-field is the appliance model type. In a preferred embodiment, the field length of the appliance model type field is two bytes. Preferably, this value is sent in network byte order. Again, preferably, the field data for the appliance model type field is two bytes in length. Predefined values are assigned for each of the managed appliances that may be connected to the network.

The MAC address field has a unique field ID which is one byte long. Preferably, the field length of the MAC address field is two bytes long. This value is preferably sent in network byte order. The length of the field data corresponding to the MAC address field is six bytes long. This value indicates the appliance's MAC address. Preferably, this value is sent in network byte order.

The IP address field has a field ID that is one byte long, in a preferred embodiment. This predefined value indicates that the variable length data field contains the IP address of the appliance. The IP address field has a field length of two bytes.

The field data of the IP address field is four bytes long and indicates the appliance's IP address. If the appliance has not been assigned an IP address, it should respond with a default IP address such as 0.0.0.0 (0x00 0x00 0x00 0x00).

A subnet mask field has a predefined field ID that is one byte long. The field length is two bytes and indicates the length of the subnet mask field data that follows. The field data corresponding to the subnet mask field is four bytes and indicates the appliance's subnet mask. If the appliance has not yet been assigned a subnet mask, it should respond with a default value such as 0.0.0.0 (0x00 0x00 0x00 0x00).

A gateway address field has a predefined field ID that is one byte long. The field length corresponding to the gateway address field is two bytes long and indicates the length of the gateway address field data that follows. The field data corresponding to the gateway address field is four bytes long and indicates the appliance's gateway address. If the appliance has not yet been assigned a gateway address, it should respond with a default value such as 0.0.0.0 (0x00 0x00 0x00 0x00).

The appliance model type field, the MAC address field, the IP address field, the subnet mask address field, and the gateway address field may appear in any order.

The Test IP Configuration message is sent from a client to a managed appliance to test if a given IP address and gateway address are valid for the appliance. The test message determines whether the appliance can route the message back to the client using the given IP and gateway addresses. The Test IP Configuration message has both a request and reply message associated with it. The header for the Test IP Configuration Request message follows the same format described above for the Discover Request message and has a unique code identifying the message in the command ID portion of the header.

In a preferred embodiment, the record data portion of the message contains the following variable length data fields: MAC address field; IP address field; subnet mask field; and gateway address field.

For the MAC address variable length data field, the field ID, the field length, and the field data sub-fields have a length of one byte, two bytes, and six bytes, respectively. The field ID identifies the variable length data field as the MAC address field. The field length sub-field indicates the length of the MAC address field data that follows. The field data sub-field indicates the value of the appliance's MAC address.

The field ID sub-field, the field length sub-field, and the field data sub-field of the IP address field are one byte, two bytes, and four bytes long, respectively. The field data portion of the IP address field indicates the appliance's IP address.

The field ID sub-field, the field length sub-field, and the field data sub-field of the subnet mask field are one byte, two bytes, and four bytes long, respectively. The field data portion of the subnet mask field indicates the appliance's subnet mask.

The gateway address field has a field ID that is one byte long, a field length sub-field that is two bytes long, and a field data sub-field that is four bytes long. The field data portion of the gateway address field indicates the appliance's gateway address. The MAC address field, the IP address field, the subnet mask field, and the gateway address field may appear in any order in a given message.

Upon receipt of the Test IP Configuration Request message, the managed appliance will send a Test IP Configuration Reply message to the client indicating the status of the Test IP Configuration Request message. In a preferred embodiment, the record data portion of the Test IP Configuration Reply message contains a status field which contains information about the status of the Test IP Configuration Request message. Like other variable length data fields, the status field has a field ID sub-field, a field length sub-field, and a field data sub-field. The field ID is one byte long, the field length is two bytes long, and the field data sub-field is two bytes long.

In a preferred embodiment, there are four different status codes that can be encoded in the field data sub-field. Those status codes are: NOERROR, IP_ADDRESS_ALREADY_EXISTS, INVALID_REQUEST, and APPLIANCE_ERROR. The NOERROR status code indicates that the IP address and gateway address contained in the Test IP Configuration Request message are valid for the appliance and that no error occurred. The IP_ADDRESS_ALREADY_EXISTS status code indicates that the appliance already has an IP address. The INVALID_REQUEST status code indicates that an invalid request was sent to the appliance. The APPLIANCE_ERROR status code indicates that the appliance was unable to process the request due to an internal error. These errors can include, for example, not enough memory, or not enough resources, etc.

The Set IP Configuration Request message is sent from a client to a managed appliance to assign an IP address, subnet mask, and gateway address in the appliance. In a preferred embodiment, the record data portion of the message contains four variable length data fields which include the MAC address, the IP address, the subnet mask, and the gateway address. For the variable length data field that contains the MAC address, the field ID sub-field, the field length sub-field, and the field data sub-field are one byte, two bytes, and six bytes, respectively. The field ID contains a code which indicates that this variable length data field contains the MAC address. The field length sub-field indicates the length of the MAC address field data that follows. The field data sub-field indicates the appliance's MAC address.

For the IP address variable length data field, the field ID is one byte long, the field length sub-field is two bytes long, and the field data sub-field is four bytes long. The field ID sub-field indicates that this variable length data field contains an IP address. The field length sub-field indicates the length of the IP address field data that follows. The field data sub-field indicates the appliance's IP address.

The field ID sub-field, the field length sub-field, and the field data sub-field corresponding to the subnet mask variable length data field are one byte long, two bytes long, and four bytes long, respectively. Like the other variable length data fields, the field ID sub-field indicates the contents of the variable length data field. In this instance, the sub-field indicates that the variable length data field contains a subnet mask for an appliance. The field length sub-field indicates the length of the subnet mask field data that follows. The field data sub-field indicates the appliance's subnet mask. The field length sub-field and the field data sub-field are each sent in network byte order.

For the gateway address variable length data field, the field ID, the field length, and the field data sub-fields are one byte, two bytes, and four bytes in length, respectively. The field length sub-field indicates the length of the gateway address field data that follows. The field data sub-field indicates the appliance's gateway address.

The MAC address variable length data field, the IP address variable length data field, the subnet mask variable length data field, and the gateway address variable length data field may appear in any order in a given message.

Upon receipt of the Set IP Configuration Request message, the managed appliance will send a Set IP Configuration Reply message to a client indicating the status of the Set IP Configuration Request message. The record data portion of the message contains a variable length data field indicating the status of the request. The status variable length data field contains a field ID, a field length sub-field, and a field data sub-field which are one byte, two bytes, and two bytes in length, respectively. The field data sub-portion of the status variable length data field indicates the status of the Set IP Configuration Request. In a preferred embodiment, the status can be one of four potential values. The four status codes are NOERROR, IP_ADDRESS_ALREADY_EXISTS, INVALID_REQUEST, and APPLIANCE_ERROR. The NOERROR status code indicates that a managed appliance successfully set its IP address, subnet mask, and gateway address as requested in the Set IP Configuration Request message. The IP_ADDRESS_ALREADY_EXISTS status code indicates that the appliance already has an IP address. The INVALID_REQUEST status code indicates that an invalid request was sent to the appliance. The APPLIANCE_ERROR status code indicates that the appliance was unable to process the request due to an internal error (for example, out of memory, not enough resources, etc.).

The SNMP Get Request message is sent from a client to a managed appliance to retrieve the value of an OID from the managed appliance. The record data portion of the SNMP Get Request message contains one or more variable binding fields. The variable binding contains the OID that the client wants to retrieve the value of from the appliance. For the variable binding variable length data field, the field ID is one byte long and the field length sub-field is two bytes long. The field data sub-field is a variable length. The field data sub-field also contains two portions. The first portion is called the OID To Retrieve portion. The second portion is called the Value Of OID portion.

The OID To Retrieve portion includes an OID type sub-field, an OID length sub-field, and an OID. The OID type sub-field is one byte long and indicates that the variable binding field is an OID. This OID type sub-field includes the ASN_OBJECTIDENTIFIER value type. The OID length sub-field is two bytes long and indicates the length of the OID to be retrieved. The OID sub-field is 8-n bytes long and indicates the value of the OID to be retrieved.

The Value Of OID sub-field includes a value type sub-field, a value length sub-field, and a value sub-field. The value type sub-field is one byte long, the value length sub-field is two bytes long, and the value sub-field is zero bytes long. The value type sub-field indicates the type of the value and should always be set to be equal to the code for the ASN_NULL value type. The value length sub-field is the length of the value. It should always be set to zero for an SNMP Get Request message. The value sub-field is the value for the OID. There should never be a value for this sub-field in an SNMP Get Request message. There may be multiple variable binding fields in an SNMP Get Request message.

In a preferred embodiment, when using the IDP protocol, only certain OIDs may be retrieved from the appliance. Preferably, the OIDs defined in the enterprise MIB that are marked with "discover" in the AVAILABILITY keyword may be retrieved. In addition to these specific enterprise MIB OIDs, the MIB-II OIDs sysName and sysObjectID can be retrieved from the appliance. No other OIDs are accessible through the IDP protocol.

Upon receipt of the SNMP Get Request message, the managed appliance will obtain the values for the OIDs specified in the variable binding values. It will then generate an SNMP Get Reply message to the client. A reply message will contain the status of the request and the values for the OIDs, if the request was successful.

The SNMP Get Reply message is sent from a managed appliance to a client in response to an SNMP Get Request message. The reply message will contain the status of the request and the values for the OIDs if the request was successful. The record data portion of the reply message will contain three variable length data fields: SNMP Error Status field; SNMP Get Response Error Index field; and Variable Binding field.

The SNMP Error Status variable length data field has a field ID sub-field, a field length sub-field, and a field data sub-field which are one byte, two bytes, and two bytes in length, respectively. The field ID sub-field is set to a predefined value to indicate that this is a SNMP Error Status field. The field length sub-field indicates the length of the SNMP Error Status data that follows. The field data sub-field contains the SNMP error status code. Preferably, the SNMP error status codes may include: NOERROR, TOOBIG, NOSUCHNAME, BADVALUE, READONLY, GENERR, INVALID_REQUEST, and APPLIANCE_ERROR.

The NOERROR, TOOBIG, NOSUCHNAME, BADVALUE, READONLY and GENERR codes are standard SNMP error codes defined in RFC1157. The appliance returns these when the SNMP request fails for one of the standard SNMP reasons. The NOERROR status code indicates that there was no error. TOOBIG indicates that the response to this SNMP request would be too large to send. NOSUCHNAME indicates that the SNMP object requested is not available. BADVALUE indicates that the value returned for the object is not a valid value for the type of the object as defined in the MIB. READONLY indicates that the client tried to set the value of an object that is marked as READ-ONLY in the MIB. GENERR is a catch-all error returned when none of the other SNMP errors is appropriate. INVALID_REQUEST is generated by the appliance when it receives a request from the client that is not properly formatted (invalid length, types, etc). APPLIANCE_ERROR is generated by the appliance when it cannot complete the request due to an error in the appliance such as out of memory, not enough resources, etc.

The SNMP Get Response Error Index variable length data field contains a field ID sub-field, a field length sub-field, and a field data sub-field that are one byte, two bytes, and two bytes in length, respectively. The field ID sub-field is set to a predefined value to indicate that this is a SNMP Get Response Error Index field. The field length sub-field indicates the length of the SNMP Get Response Error Index data that follows. The field data sub-field contains the SNMP Get Response Error Index. Preferably, this value should be zero if the value for the SNMP Error Status field is NOERROR, INVALID_REQUEST, or APPLIANCE_ERROR. If an SNMP error occurs, the SNMP Get Response Error Index variable indicates which variable binding gave rise to the error.

The variable binding variable length data field has a field ID sub-field that is one byte long, and a field of length sub-field that is two bytes long. The variable binding variable length data field also has a field data sub-field that includes an OID Retrieved sub-field and a Value Of OID sub-field. The OID Retrieved sub-field includes the following three sub-fields: OID type, OID length, and OID. The OID type sub-field is one byte long. The OID length sub-field is two bytes long. The OID value sub-field is 8-n bytes long. The OID type sub-field indicates that this is an OID. The OID length sub-field indicates the length of the OID retrieved. The OID sub-field indicates the OID whose value was requested.

The Value Of OID sub-field includes the following three sub-fields within itself: value type, value length, and value.

The value type sub-field is one byte long, and the value length sub-field is two bytes long. The value sub-field is 0-n bytes long. The value type sub-field is the value type for the OID requested. The value length sub-field is the length of the value. The value sub-field is the value for the OID requested. There may be multiple variable binding variable length data fields in an SNMP Get Reply message. There should be one for every variable binding that was requested in the SNMP Get Request message.

The SNMP Get Next Request message is sent from the client to a managed appliance to retrieve the value for the OID following the OID that is specified in the variable binding variable length data field. The record data portion of the message contains a variable binding variable length data field. The variable binding field contains the OID preceding the OID that the client wants to retrieve the value of from the appliance. The variable binding variable length data field contains a field ID sub-field and a field length sub-field. The field ID sub-field is one byte long. The field length sub-field is two bytes long. The field data sub-field is a variable length and contains two portions. The first portion is the OID To Get Next sub-field. The OID To Get Next sub-field contains an OID type sub-field, an OID length sub-field, and an OID sub-field. The OID type sub-field is one byte long. The OID length sub-field is two bytes long. The OID sub-field is 8-n bytes long. The value in the OID type sub-field is a predefined value that indicates that this is an OID. The OID length sub-field is the length of the OID to get next. The OID sub-field is the OID preceding the OID whose value is requested by the client.

The second portion of the field data sub-field is the Value Of OID sub-field. The Value Of OID sub-field contains a value type sub-field, a value length sub-field, and a value sub-field. The value type sub-field is one byte long; the value length sub-field is two bytes long; and the value sub-field is zero bytes long. The value type sub-field is the type of the value and preferably is set to the value of the ASN_NULL value type for an SNMP Get Next Request message. The value length sub-field is the length of the value and is set to zero for an SNMP Get Next Request message. The value sub-field is the value for the OID. In a preferred embodiment, there should not be a value for the value sub-field in an SNMP Get Next Request message. There may be multiple variable binding variable length data fields in an SNMP Get Next Request message.

When using the IDP protocol, only certain OIDs may be retrieved from the appliance. The OIDs defined in the enterprise MIB that are marked with "discover" in the AVAILABILITY keyword may be retrieved. In addition to the specific enterprise MIB OIDs, the MIB-II OIDs sysName and sysObjectID can be retrieved from the appliance. In a preferred embodiment, no other OIDs are accessible through the IDP protocol.

Upon receipt of the SNMP Get Next Request message, the managed appliance will obtain the values for the OIDs following the OIDs specified in the variable binding values. The managed appliance will then generate an SNMP Get Next Reply message to the client. The message will contain the status of the request and the values for the OIDs following the OIDs specified in the request message, if the request was successful.

In a preferred embodiment, the SNMP Get Next Reply message is sent from a managed appliance to the client in response to an SNMP Get Next Request message. The record data of the reply message contains the following variable length data fields: an SNMP Error Status field; an SNMP Get Response Error Index field; and a Variable Binding field.

The SNMP Error Status variable length data field has three sub-fields: a field ID sub-field (one byte); a field length sub-field (2 bytes); and a field data sub-field (2 bytes). The field data sub-field contains the SNMP Error Status. In a preferred embodiment, the SNMP Error Status codes include the following: NOERROR, TOOBIG, NOSUCHNAME, BADVALUE, READONLY, GENERR, INVALID_REQUEST, and APPLIANCE_ERROR.

The SNMP Get Response Error Index variable length data field also includes three sub-fields. The field ID sub-field is one byte long. The field length sub-field is two bytes long. The field data sub-field is two bytes long. The field data sub-field includes the SNMP Get Response Error Index. This value should be zero if the value for the SNMP Error Status field is NOERROR, INVALID_REQUEST, or APPLIANCE_ERROR. If an SNMP error occurs, the SNMP Get Response Error Index variable indicates which variable binding caused the error.

In an SNMP Get Next Reply message, the variable binding variable length data field contains the OID following the OID that was contained in the corresponding SNMP Get Next Request message as well as the value for the OID following the OID specified in the SNMP Get Next Request message. The field ID sub-field for the variable binding field is one byte long. The field length sub-field is two bytes long. The field data sub-field is a variable length field. It includes a Next OID sub-field and a Value Of Next OID sub-field. The Next OID sub-field contains an OID type sub-field (one byte), an OID length sub-field (two bytes), and an OID sub-field (8-n bytes). The OID type sub-field indicates that this is an OID. The OID length sub-field indicates the length of the next OID. The OID sub-field identifies the next OID which was requested in the request message.

The Value Of Next OID sub-field includes three sub-fields. The value type sub-field is one byte long. The value length sub-field is two bytes long. The value sub-field is 0-n bytes long. The value type sub-field is the ASN.1 value type for the next OID requested. The value length sub-field is the length of the value. The value sub-field is the value for the next OID requested. There may be multiple variable binding fields in an SNMP Get Next Reply message. There should be one for every variable binding field that was requested in the SNMP Get Next Request message.

Figure 5:
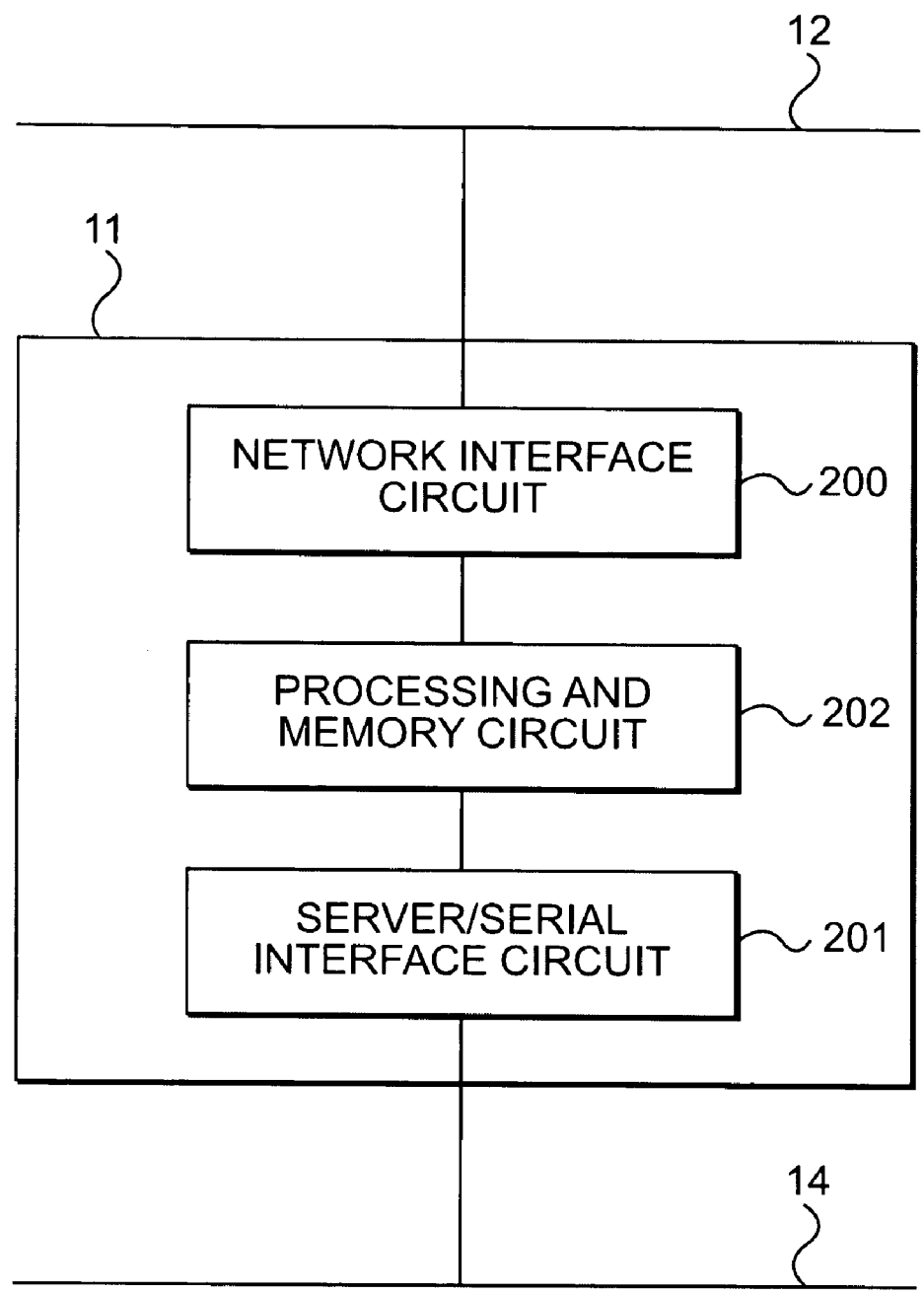
FIG. 5 shows a block diagram of components of a managed appliance according to the present invention.

FIG. 5 shows a block diagram of a managed appliance 11 according to the present invention. In a simple form, the managed appliance 11 includes a network interface circuit 200, a processing and memory circuit 202, and a server/serial interface circuit 201. The network interface circuit 200 communicates with other devices on the network 12. Network interface circuit 200 receives data from other network devices and decodes and/or reformats the received information into a format that can be used by the managed appliance 11. Network interface circuit 200 also formats data received from the processing and memory circuit 202 for transmission through network 12.

Server/serial interface circuit 201 communicates with the devices, such as servers 13 or serial devices, connected to communication link 14. Server/serial interface circuit 201 receives data from the servers 13, serial devices or other devices, and decodes and/or reformats the received information into a format that can be used by the processing and memory circuit 202 of managed appliance 11. Server/serial interface circuit 201 also formats data received from the processing and memory circuit 202 for transmission through communication link 14 to the servers 13, serial devices or other devices.

Processing and memory circuit 202 determines the destination of data received from the network 12 and from the communication link 14. For example, if a workstation 10 sends commands that are destined for a particular server 13, the commands are first received from network 12 by the network interface circuit 200. After reformatting, the commands are sent to the processing and memory circuit 202 where the processing and memory circuit 202 determines which server 13 is to receive the commands. The processing and memory circuit 202 forwards the commands to the server/serial interface circuit 201 with information identifying the particular server 13 that is to receive the commands. Server/serial interface circuit 201 responds to the information from the processing and memory circuit 202 by reformatting the commands into a format suitable for transmission to the particular server 13. The server/serial interface circuit then transmits those commands to the server 13.

A similar operation occurs for data that originates at a particular server 13 or serial device that is destined for a workstation 10. For example, the server data is received, and reformatted by the server/serial interface circuit 201. The processing and memory circuit 202 receives that data and determines which workstation is to receive the data. This determination can be based on a number of factors including whether a particular workstation 10 is currently assigned or otherwise matched to a particular server 13 or serial device; the identity of the server 13 or serial device that generated the data; the content of the data received from the server 13 or serial device, etc. The processing and memory circuit 202 sends the data to the network interface circuit 200 with information identifying the particular workstation 10 which is to receive the server data. The network interface circuit 200 reformats the server data as necessary and sends the data to the workstation through the network 12.

The workstation 10 also transmits IDP commands to the managed appliance 11. In a preferred embodiment, those commands include Discover Request message, Test IP Configuration Request message, Set IP Configuration Request message, SNMP Get Request message, and SNMP Get Next Request message. Unlike commands that are destined for a server 13, these IDP commands are destined for the managed appliance 11. When an IDP command is received by a managed appliance 11, the network interface circuit 200 decodes and/or reformats the information into a format that can be used by the processing and memory circuit 202.

When the processing and memory circuit 202 receives an IDP command, it generates an appropriate reply message. In a preferred embodiment, the IDP reply messages include Discover Reply message, Test IP Configuration Reply message, Set IP Configuration Reply message, SNMP Get Reply message, and SNMP Get Next Reply message. The processing and memory circuit 202 forwards the IDP reply messages to the network interface circuit 200 where the messages are reformatted and transmitted through network 12 to workstation 10. The reply messages can be sent to the workstation 10 which sent the request message to the managed appliance 11. Alternatively, the reply messages can be sent to another workstation 10 or other network device if desired.

The processing and memory circuit 202 also sets the IP configuration of the managed appliance 11. When the managed appliance 11 receives a Set IP Configuration Request message, the processing and memory circuit 202 sets the managed appliance's IP configuration by storing the assigned MAC address, the IP address, the subnet mask, and the gateway address in memory within the processing and memory circuit 202. This IP configuration remains set for security purposes until it is cleared via the local CLI console or via a secure configuration mechanism like the Secure Management Protocol disclosed in U.S. Pat. No. 7,506,041, filed on Aug. 1, 2003, issued Mar. 17, 2009.

After the IP configuration of the managed appliance has been set, the processing and memory circuit 202 instructs the network interface circuit 200 to transmit a Set IP Configuration Reply message through the network 12 to the workstation 10 that sent the Set IP Configuration Request message, or to another network device. The Set IP Configuration Reply message contains the then-current IP configuration of the managed appliance.

The processing and memory circuit 202 also stores information about the servers 13 that can be included in a reply message. This information includes the server name and other information about the server that may be transmitted to the client workstation. When the managed appliance 11 receives a SNMP Get Request message or a SNMP Get Next Request message, the processing and memory circuit 202 retrieves the requested information about the server, matches it with the OID, and forwards that information to the network interface circuit 200. The network interface circuit 200 then reformats the data and transmits it through the network 12 to the workstation 10 that sent the request message or to another network device.

Modifications and substitutions to the present invention made by one of ordinary skill in the art are considered to be within the scope of the present invention, which is not to be limited except by the claims which follow.

What is claimed is:

1. A method of configuring a device across a network,
wherein the device is a managed appliance for operatively communicating keyboard data, cursor control data, and video data between a plurality of computers connected to the network and a workstation connected to the network,
the method comprising:
(a) the workstation broadcasting a User Datagram Protocol (UDP) discover request message across the network;
(b) in response to said UDP discover request message from the workstation, said device transmitting a UDP discover reply message, the discover reply message including at least a portion of an Internet Protocol (IP) configuration of the device, wherein the portion of the IP configuration includes a Media Access Control (MAC) address of the device, an IP address of the device, a subnet mask, and a gateway address of the device,
wherein, if the device has not already been assigned an IP address, then the IP address sent in the UDP discover reply message is a default IP address, and wherein,
if the device has not already been assigned a subnet mask, then the subnet mask sent in the UDP discover reply message is a default subnet mask, and wherein,
if the device has not already been assigned a gateway address, then the gateway address sent in the UDP discover reply message is a default gateway address;
(c) said workstation broadcasting a UDP test IP configuration message said UDP test IP configuration message including: the MAC address of the device, an IP address, a subnet mask, and a gateway address; and
(d) upon receipt of said test IP configuration message,
(d1) said device sending a UDP test IP configuration reply message to the workstation, said test IP configuration reply message indicating a status, and
(d2) if said device does not already have an IP address, said device temporarily setting its IP configuration to configuration values sent in the UDP test IP configuration message from the workstation;

(e) upon receipt of the test IP configuration reply message from the device, the workstation sending a set IP configuration request message to the device, said set IP configuration request message including an IP address, a subnet mask, and a gateway address, and the MAC address of the device; and (f) in response to said set IP configuration request message, said device
  (f1) setting the IP configuration parameters in the device to correspond to the IP address, the subnet mask, and the gateway address sent with the instruction set IP configuration request message; and
  (f2) sending a UDP set IP configuration reply message to the workstation indicating a status of the set IP configuration message.

2. The method of claim 1, wherein the device is a managed appliance for operatively communicating keyboard data, cursor control data, and video data between the plurality of computers and the network.

3. The method of claim 1, wherein the network is a wireless communication network.

4. A method of configuring a device across a network, comprising:
  (A) broadcasting a discover request message from a workstation on the network to a plurality of devices on the network, said discover request message using the User Datagram Protocol (UDP);
  (B) in response to receipt of said discover request message from said workstation, a particular device of said plurality of devices:
    (b1) looking up values of object identifiers (OIDs) associated with said device in order to determine a configuration of the particular device, and
    (b2) transmitting a discover reply message from the particular device to the workstation, the discover reply message containing at least a portion of the configuration of the particular device, wherein the portion of the configuration includes an Internet Protocol (IP) address of the particular device and a Media Access Control (MAC) address of the particular device;
  (C) in response to receipt of said discover reply message from said device, said workstation broadcasting a test IP configuration request message, said test IP configuration request message including a MAC address of the particular device;
  (D) upon receipt of said test IP configuration request message, said particular device transmitting a test IP configuration reply message to the workstation, the test IP configuration reply message indicating a status result of the test IP configuration request message;
  (E) upon receipt of the test IP configuration reply message from the particular device, the workstation transmitting a set IP configuration request message to the particular device to attempt to cause the particular device to set at least one portion of the IP configuration or the particular device to correspond to the IP configuration that was sent with the test IP configuration request message in step (C); and
  (F) in response to receipt of the set IP configuration request message from the workstation, the particular device:
    (f1) attempting to set its IP configuration to correspond to the IP configuration sent by the workstation; and
    (f2) transmitting a set IP configuration reply message from the particular device to the workstation, the set IP configuration reply message indicating a status of actions taken in response to receipt of the set IP configuration request message by the particular device.

5. The method of claim 4, further comprising:
  transmitting from the device information corresponding to at least one of a plurality of computers communicatively coupled to the device.

6. The method of claim 4, wherein the network is a wireless communication network.

7. The method of claim 1 wherein the discover reply message also includes a model type of the device.

8. The method of claim 1 wherein the IP address, the subnet mask, and the gateway address sent by the workstation in the test IP configuration message in (c) are the same as the IP address, the subnet mask, and the gateway address sent by the workstation in the set IP configuration request message in (e).

9. The method of claim 1 wherein the test IP configuration request message is sent from the workstation in (c) to test if the IP address and gateway address sent with the IP configuration message are valid for the device.

10. The method of claim 1 wherein the status of the test IP configuration request message included in the test IP configuration reply message in (d1) comprises at least one status selected from:
  (i) a first status indicating that that the IP address and gateway address contained in the test IP configuration request message are valid for the device and that no error occurred;
  (ii) a second status indicating that that the device already has an IP address.

11. The method of claim 4 wherein the portion of the IP configuration in the discover reply message sent in step (b2) also includes a subnet mask, and a gateway address of the particular device.

12. The method of claim 11 wherein the portion of the IP configuration in the discover reply message sent in step (b2) also includes a model type of the particular device.

13. The method of claim 4 wherein the test IP configuration request message broadcast by the workstation in step (C) includes an IP address.

14. The method of claim 13 wherein the test IP configuration request message broadcast by the workstation in step (C) further includes a gateway address.

15. The method of claim 13 wherein the test IP configuration request message broadcast by the workstation in step (C) further includes a subnet mask.

16. The method of claim 14 wherein the status included in the test IP configuration reply message in step (D) comprises a status selected from:
  (i) a first status indicating that that the IP address and gateway address contained in the test IP configuration request message are valid for the particular device and that no error occurred;
  (ii) a second status indicating that that the particular device already has an IP address.

17. The method of claim 4 wherein the IP address, the subnet mask, and the gateway address sent by the workstation in the set IP configuration request message in (E) were also sent in the test IP configuration request message in (C).

18. The method of claim 4 wherein the particular device is a managed appliance for operatively communicating keyboard data, cursor control data, and video data between a plurality of computers connected to the network and at least one workstation connected to the network.

* * * * *